United States Patent Office 2,850,504
Patented Sept. 2, 1958

2,850,504
PREPARATION OF AMINOTHIAZOLES

Robert B. Currie, Roselle, and Ralph H. Beutel, Newark, N. J., assignors to Merck & Co., Inc., Rahway, N. J., a corporation of New Jersey No Drawing. Application January 7, 1957
Serial No. 632,635

4 Claims. (Cl. 260—306.8)

This invention relates to the preparation of 2-aminothiazoles by the condensation of a 2,5-dihydroxy-1,4-dithiane with cyanamide.

In accordance with the present invention, cyanamide is condensed with the cis or trans form or mixture of the cis and trans forms of 2,5-dihydroxy-1,4-dithiane or 2,5-dihydroxy-3,6-disubstituted 1,4-dithianes, which may be identified by the following formula:

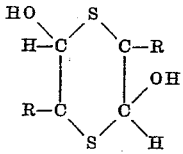

wherein R is hydrogen, lower alkyl, aryl or aralkyl.

We have found that these two compounds, i. e., cyanamide and 2,5-dihydroxy-1,4-dithiane or 2,5-dihydroxy-3,6-disubstituted 1,4-dithiane may be condensed in the presence of water to yield a 2-aminothiazole having the structural formula:

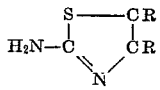

wherein R is as above.

The 2-aminothiazole prepared in accordance with this invention is useful as an intermediate in the preparation of sulfathiazole. The sulfathiazole may be prepared by condensing 2-aminothiazole with N-acetylsulfanilyl chloride in the presence of pyridine and hydrolyzing the resulting acetylsulfathiazole to sulfathiazole with acid or base.

Sulfathiazole and its derivatives, which are useful antibacterial and therapeutic agents, can consequently be economically made on a commercial scale with optimum yields in accordance with the process of the present invention.

The starting material in this novel process, 2,5-dihydroxy-1,4-dithiane, may be provided by any known synthesis such as from a hydrosulfide and chloroaldehyde such as α-chloropropionaldehyde or chloroacetaldehyde, as for example the preparation of 2,5-dihydroxy-1,4-dithiane from sodium hydrosulfide and chloroacetaldehyde (Montash 55, 1088–96, 1954).

Specifically, in accordance with the present invention, cyanamide is reacted with 2,5-dihydroxy-1,4-dithiane in an aqueous medium. While the reaction is preferably conducted at temperatures in the range of 40° to 100° C., the preferred temperature for optimum yields is an initial temperature of 40° C. and final temperature of 80° C. The pH of the reaction medium may range between the limits of an initial pH of 3 to 9 and final range of 5 to 9. Any suitable acid rendering a pH within the ranges specified above may be employed such as hydrochloric, sulfuric, acetic, maleic and phosphoric acids. The rate of the reaction will vary with the temperature and the pH of the reaction medium. When the reaction is complete the mixture is made alkaline where necessary, cooled to about room temperature or below and the precipitated 2-aminothiazole is recovered. The 2-aminothiazole may then be conveniently converted to sulfathiazole.

In order that the invention may be more fully understood, the following examples are set forth for the purpose of illustration and the enumeration of details is not to be construed as limiting the scope of the invention. All parts used are parts by weight unless otherwise expressly stated.

Example 1

To 244 milliliters of a 0.818 N (0.200 mole) solution of cyanamide, neutralized to pH 6.5 with concentrated hydrochloric acid and heated to 40° C., was added 15.2 grams (0.200 equivalent) of 2,5-dihydroxy-1,4-dithiane. The pH of the mixture rose immediately to pH 9.0 and was constant at pH 9.15 after 5 minutes; the temperature rose to 51° C. To the reaction mixture was added 18 milliliters of concentrated hydrochloric acid to adjust the pH of the solution to pH 0.5 and the solution was held at 80° C. for one hour. After saturating the solution with 55 grams of sodium chloride and cooling to 5° C., the aminothiazole was precipitated by the addition of 20 milliliters of 34% sodium hydroxide, thereby adjusting the pH to 9. The mixture was held for one hour at 5° C., the product filtered, washed with cold saturated sodium chloride solution and dried. The yield of crude aminothiazole was 16.0 grams.

*Assay.*—5 grams in 50 milliliters of water required 47.0 milliliters of 0.9613 N sulfuric acid to pH 3.5, or an assay of 90.2%.

The yield of pure aminothiazole was therefore 14.5 grams or 72.3% of the theoretical. The melting point was 85–89.5° C., which after crystallization from benzene in 78% yield, melted at 87.5–90.2° C.

A mixed melting point with an authentic sample of 2-aminothiazole gave no depression.

Reacting the product with acetic anhydride gave 2-acetyl aminothiazole, having a melting point of 205.5–207.2° C., which gave no depression of the melting point with an authentic sample.

Example 2

To 122 milliliters of a 0.818 N (0.100 mole) solution of cyanamide, neutralized to pH 4.5 with concentrated hydrochloric acid and heated to 80° C., was added 7.6 grams (0.100 equivalent) of 2,5-dihydroxy-1,4-dithiane. The pH of the mixture rose immediately to pH 8.2. To the reaction mixture was added sufficient hydrochloric acid (7.8 milliliters) to adjust the pH of the solution to pH 3.0 and the solution was held at 80° C. for one-half hour. The solution was brought to pH 10 by the addition of 8 milliliters of 34% sodium hydroxide. After saturating the solution with 30 grams of sodium chloride and cooling to 5° C., the aminothiazole was precipitated. The mixture was held for 15 minutes at 5° C., the product filtered, washed with cold saturated sodium chloride solution and dried.

The yield was 17.0 grams assaying 37% pure aminothiazole or 62.9% of the theoretical yield.

Example 3

A solution of 136 milliliters of 1.615 N (0.220 mole) a cyanamide which had been neutralized to pH 6.0 with concentrated hydrochloric acid was heated to 42.5° C. and 15.2 grams (0.20 equivalent) of 2,5-dihydroxy-1,4-dithiane was added. The pH of the mixture rose immediately to pH 8 but concentrated hydrochloric acid was added to drop and maintain the pH between 3.5 and 3.7 during the remainder of the reaction. The temperature after one minute rose to 70° C., and after 45 minutes had dropped back to 35° C. A total of 15.6 milliliters of hydrochloric acid was used to maintain the pH of the solution between pH 3.5 to 3.7. After saturating the solution with 15 grams of sodium chloride and cooling to 5° C., the aminothiazole was precipitated by the addition of 16.5 milliliters of 34% sodium hydroxide to pH 10. The mixture was held for one hour at 15° C. The product was filtered, washed with cold sodium chloride solution and dried.

The yield of crude aminothiazole was 21.0 grams.

*Assay.*—31.0 milliliters×.9613 N×2=59.7%, 21.0×.597=12.5 grams pure aminothiazole or 62.5% of the theoretical yield.

*Example 4*

To 136 milliliters of 1.615 N (0.22 mole) of cyanamide neutralized to pH 6.5 with concentrated hydrochloric acid and heated to 40° C. was added 15.2 grams (0.200 equivalent) of 2,5-dihydroxy-1,4-dithiane. The pH of the mixture rose immediately to pH 8 and was constant at 9.3 after five minutes. The temperature rose to 53° C. The solution was held between 52 and 54° C. for one hour and fifteen minutes. After saturating the solution at 60° C. with 30 grams of sodium chloride, filtering hot and cooling to 5° C., the aminothiazole was allowed to crystallize for one hour at 5° C. The product was filtered, washed with cold saturated sodium chloride salt solution and dried.

The yield was 11.8 grams, assaying 90.5% pure aminothiazole or 53.5% of the theoretical yield.

*Example 5.—Preparation of sulfathiazole*

A solution of 2-aminothiazole in pyridine, obtained by any of the procedures of Examples 1 through 4, was added to a pyridine solution of N-acetylsulfanilyl chloride to form N-acetylsulfathiazole and the latter compound hydrolyzed to sulfathiazole.

The above examples and description are illustrative only and may be changed and modified without departing from the principles and scope of the present invention.

We claim:

1. The process of preparing 2-aminothiazoles, which comprises reacting cyanamide with a dithiane compound having the formula:

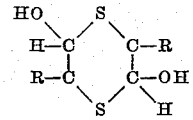

wherein R is selected from the group consisting of hydrogen, lower alkyl, aryl and aralkyl to form 2-aminothiazoles.

2. The process as claimed in claim 1, in which the dithiane compound is 2,5-dihydroxy-1,4-dithiane.

3. The process of condensing 2,5-dihydroxy-1,4-dithiane and cyanamide in a medium having a pH value between 3.0 and 9.

4. The process of preparing 2-aminothiazoles, which comprises heating 2,5-dihydroxy-1,4-dithiane in an aqueous solution of cyanamide at a temperature within the range of 40° C. to 100° C., acidifying and maintaining the pH within the ranges of 0.5 to 9.0, adding sodium hydroxide to pH 10.0, cooling and recovering 2-aminothiazole from the reaction.

References Cited in the file of this patent

UNITED STATES PATENTS 2,600,620     Crauland _____ June 17, 1952